United States Patent Office 3,471,419
Patented Oct. 7, 1969

3,471,419
PORE-FILLED OPEN-CELL FOAM
Joseph Ronald Ehrlich, 1793 Riverside Drive,
New York, N.Y. 10034
No Drawing. Filed Sept. 29, 1965, Ser. No. 491,389
Int. Cl. C08g 41/04, 22/44
U.S. Cl. 260—2.5      7 Claims

ABSTRACT OF THE DISCLOSURE

Non-resilient, pliable, ductile filled-foam product comprising originally flexible and resilient open-cell polymeric foam, the cells of which are filled with from about four times to about twenty-five times by weight thereof of a solid material selected from a microcrystalline wax; a microcrystalline wax compounded with at least one of polyethylene, polyisobutylene, and a plasticizer compatible with said microcrystalline wax; and a plasticized, low molecular weight polystyrene resin composition consisting essentially of about 60% by weight of a polystyrene resin having a melting point of about 100° C. and about 40% by weight of dicyclohexyl phthalate. Produced by impregnating foam with heated liquid comprising filling material and thereafter solidifying filling material within cells.

---

The object of this invention is to make new materials with interesting properties by using open cell foam or sponge material, displacing the air in the pores of the foam and filling the empty cells with solid material which is different from the material of which the foam or sponge is made, and which is firmly anchored within the cells of the foam.

The base for this new material are open cells foams of the flexible, resilient type, in contrast to rigid foams. Such flexible foams may be polyurethane foams also called isocyanate foams, of the polyester or polyether type, vinyl foams such as polyvinyl chloride foams, rubber foams, etc. Such open cell foams can be made to have a great number of very small pores e.g. from 60 to 120 pores per lineal inch which are interconnected and which, under normal conditions, are filled with air. When an open sponge is immersed in a liquid, e.g. in water, the pores fill with the liquid, partly because of capillary action, and the liquid replaces the air. This sponging action is well known and is being used for absorbing liquids from wet surfaces. When a wet sponge is squeezed it releases liquid and fills itself again with air as soon as the exerted pressure is removed. The resilience of the sponge material restores the original size of the pores and shape of the cells. When a sponge is squeezed before immersing it in a liquid the sponging action is even quicker because a vacuum is created in the pores when the squeezing pressure is released. Capillary action and vacuum can then hold a considerable amount of liquid in the sponge.

The object of this invention is to make new materials with interesting properties by using the sponging properties of open cell foams by allowing the foam to absorb liquids which can then solidify in the pores. Such "filled" foams are not to be confused with foams made of plastic material with solid fillers incorporated therein which form the cell walls around the air-filled pores and which are also, through erroneously, designated as filled foams.

The pore-filling material changes the properties of the sponge significantly. The most significant change is that the sponge looses its resiliency though not necessarily its flexibility or pliability. A pore-filled sponge assumes to a degree many of the properties of the pore-filling material, while it still retains its cell structure.

When a piece of plastic foam is surface coated the finished surface exhibits properties which are characteristic of the coating material. Below the coated surface the foam is still the way it was on the surface before the coating, as one can easily see when cutting through said foam. However, when the pores of an open cell foam are filled with another material the entire product is uniformly changed throughout its body. When such a foam is cut into smaller pieces, all surfaces of all cut pieces exhibit the same properties. It is e.g. known to coat the surface of flexible foam sheets with dry adhesives. The coated surface of such sheet is then either pressure-sensitive or activated with solvents, water or heat. However, when the pores of an open-cell foam, e.g. in the shape of a cube with a side length of four inches are filled with a dry adhesive all pieces of any shape cut from such a cube will have adhesive properties on their entire surface.

The pores of such sponge material can be completely or partly filled with the solid pore-filling material. When an uncompressed sponge material with substantially uniform pore size is immersed e.g. in hot molten wax and left there until no more liquid wax is absorbed, it can for all practical purposes considered to be completely filled, when the wax-filled sponge is removed from the liquid wax without squeezing and the wax is allowed to solidify, no more air can enter or leave the wax-filled sponge or pass through it. Yet, had the sponge been compressed before immersing it in the molten wax and the pressure released while immersed in the hot liquid, even more wax would have entered the pores. But the resulting pore-filled sponge would in its properties not be any different from the sponge which was immersed uncompressed, except that there would be a difference in weight. On the other side, the foam filled with the hot liquid wax could be allowed to drain or could be slightly squeezed and the cooled finished product still would not permit any passage or entering of air. Depending on the amount of the pore-filling material in relation to the foam material itself the finished material will exhibit properties which will be the combined result of the materials involved, with either the properties of the filler or those of the foam more or less pronounced.

The possibilities and practical applications of this new type of materials will become evident as this specification progresses.

A prerequisite for a proper impregnation or filling of the pores is that the filling or impregnating material, in addition of being a liquid which can turn into a solid, is of sufficiently low viscosity so that it may penetrate into the pores without difficulty.

The smaller the pores the less viscous the impregnating material should be.

Filling materials which can be applied in liquid form and which later-on turn solid, generally speaking, can be meltable solids which melt to form thin liquids and then solidify at room temperature, liquid monomers or copolymers which can be polymerized or crosslinked in the pores of the foam or solids with a high degree of solubility in solvents which can be evaporated.

Meltable filler solids can be e.g. straight or compounded waxes, straight or compounded resins and thermoplastics, numerous inorganic or organic compounds and alloys. One important consideration for choosing a meltable filler material is to use a material which can be melted and sufficiently liquified at a temperature low enough as not to damage the sponge material. Certain vinyl sponges might be vulnerable at temperatures as low as 70° C., whereas e.g. polyurethane- and rubber foams remain unaffected at much higher temperatures.

One preferred use of the idea is a material which shall be described in the following:

A resilient, flexible, open-cell foam, preferably of the isocyanate type is filled with microcrystalline wax to a degree that the foam has lost all its resiliency and elasticity. This filled foam, when e.g. in the shape of sticks with a square cross section of ¼ or ½ inch, e.g. in sizes of 3 x ¼ x ¼ in. or 5 x ½ x ½ in. or any other length and width is stiff like a soft material wire or a soft, thin metal sheet, but at the same time is pliable like a wire. When bent into a right angle or in any other way it remains in the shape and position into which it was bent. When folded over at an 180° angle surfaces touch and hold together and the material does not break or tear. When squeezed, the material flattens and remains that way. When pulled on both ends it shows a considerable amount of ductility and it remains elongated. When the proper type of microcrystalline wax is used as filler, the filled foam pieces stick to each other under light pressure.

The above described properties make the material eminently fit for a toy. From sticks and thin sheets which may be die-cut all kind of objects can be built and formed, such as artificial flowers, birds, butterflies, animals, figures, faces, models or any kind of objects. Smaller pieces can be cut from larger pieces, all having the same inherent properties, to suit any purpose or design. Sticks or sheets are stiff enough to build house models, bridges, or litle airplanes, yet a stick can be rolled and squeezed into a ball or a cylinder or flattened out to form a flower petal. In a way, this sponge material almost behaves like a modelling clay, except that the cell structure is still retained so that any shaped or even apparently coalesced pieces remain individual pieces. Though such pieces can be squeezed together to apparently form one single mass, like a putty or clay they completely come apart again. When differently colored modelling masses are squeezed together to a ball their colors blend. When differently colored wax-filled foam pieces are squeezed together to form a ball different colored pieces remain different units which can be taken apart. Foam pieces of this kind can be pressed together with slight pressure and will adhere to each other without losing their form or shape. But under stronger pressure and squeezing or stretching they are irreversibly deformed. The wax-filled foam can also be made so that the foam or any cut part of it will adhere also to other surfaces than that of its own kind.

The following description will exemplify how to produce such wax-filled open-cell foam for toy- or model sets.

An open-cell, soft and flexible isocyanate foam with about 80 pores per lineal inch and having a density of 1.75 lb./cu. ft. is dipped in hot, liquid microcrystalline wax. The surface of the wax-soaked foam is slightly scraped with a scraper to remove any liquid layer of excess wax which stays unabsorbed on the surface and might form a visible, waxy layer after solidification. The filled foam consists roughly of 92% by weight wax and 8.00% by weight cellular plastic. The weight increase is 11.5 times the weight of the open-cell foam. The resulting material is slightly stiff, pliable, non-resilient, non-elastic and ductile.

In order to obtain these results the microcrystalline wax should be a so-called plastic wax with a melting point of about 140° F. to about 175° F. (ASTM D 127–49) and a needle penetration of about 15 to 80 (ASTM D 1321–54T) and a Saybolt Universal viscosity at 210° F. of 60/95.

Within these broad ranges there are many waxes available with much closer melting- and needle penetration ranges. A microcrystalline wax with a melting point of about 155°/165° F. and a needle penetration of 25/35 will yield a filled foam as described which, in addition to the listed properties, will also be adherent to its own surface and to other surfaces. A microcrystalline wax with a melting point of 140° F. and a needle penetration of 35/45 will yield a filled foam as described which will adhere to its own surface and very slightly or not at all to to other surfaces. A microcrystalline wax with a melting point of 155° F. and a needle penetration of 60/80 will yield a filled foam which is quite soft and pliable which will neither properly adhere to its own surface nor to any other one. A microcrystalline wax with a melting point of 170°/175° F. and a needle penetration of 15/20 will yield a rather stiff filled foam with reduced ductility and pliability and no adhering properties.

However, by the increasing or decreasing the amount of wax in the foam these properties can be somewhat changed or shifted. For instance, by increasing the wax weight to about 15 times the weight of the foam a wax with a needle penetration of 35/45 will yield a filled foam which will adhere to both its own and to other surfaces, while by decreasing the weight to less than 11½ times the weight of the foam, e.g. to 8 times, a wax with a needle penetration of 25/35 will yield a filled foam with considerably reduced adhesive properties, such as being adhesive to its own surface but not to others.

The above weight relations refer to a foam of a density of about 1.75 lb./cu. ft. Using heavier foams the relation of the weight of wax to the weight of foam might go down as much as 4 to 1, whereas with lighter foams, which might be as light as 0.9 lb./cu. ft., the relation of the weight of wax to the weight of foam might be as much as 25 to 1.

There are various other factors and/or methods which influence and/or may be used for controlling the relationship of the weight of wax to the weight of sponge material. Selecting waxes with respect to their viscosity, selecting higher or lower temperatures for dipping, extending the immersing time, using foams whose cell walls are coated with a film-forming material, removing part of the absorbed hot wax by pressing, draining, centrifuging etc. or by diluting the liquid wax with a volatile solvent are some of those factors and/or methods.

E.g. a wax with a melting point of 140° F. and needle penetration of 35/45 might have a Saybolt Universal viscosity of 60/70 or 70/85 at 210° F. Using the wax with the lower viscosity, all other factors the same, one can get more wax into the foam. A good working temperature is about 110° C. (230° F.), which is about 70° F. above the average melting temperature of the melting point ranges given in the preceding examples. Naturally, higher or lower temperatures can be applied. The viscosity of the waxes decreases as the temperature increases.

Dipping periods as short as 3 seconds might lead to weight increases of 5 to 9 times the weight of foam, while a dipping time e.g. of 20 seconds or more might yield weight increases of 15 times to 25 times.

To put less wax into the foam or to be able to use more viscous waxes or compounded waxes one can dilute the wax with solvents. Hexane is a good solvent for many microcrystalline waxes and waxes which are compounded with polyethylene, polyisobutylenes, resins etc. These waxes and compounds are easily dissolved at a ratio 1:1 at 50°–60° C. to form low viscosity solutions.

Various methods may be used to fabricate these new materials and particularly individual elements or pieces which might be used for toy sets or model kits.

Flexible, open-cell foams are available in logs, sheets and rolls. For the particular purpose it is preferable to use sheets or sheeted rolls as a starting material, with any surface skin first removed. Such sheets or rolls in any desired or useful width can be fed into and through a dipping trough, containing the impregnating liquid, and any excess of impregnating material can be controlled or removed by feeding the liquid-laden foam through squeeze-rollers whose pressure can be controlled to any desired degree. Likewise, can the dipping time be controlled by the moving speed and length of immersion distance. The impregnated material can be fed from the squeezing rolls over cooling or heating rolls or over a wire-mesh conveyor where the hot material can be either cooled down by any known means or the solvent can be evaporated by heat, followed by further cooling.

Instead of using squeeze rolls, the impregnated material can also be put on an open-wire mesh conveyor with additional heat applied, so that the excess material can drain off through the wire mesh into or onto a collecting trough or area from where the drained-off material can be collected for re-use.

After the material has solidified it can be cut into pieces of any desired shape and size either with hot rotating knives, hot wires or hot dies; or with cold lubricated cutting devices.

Another method is to cut the untreated foam first into whatever shape or size is desired and dipping the cut pieces in bulk. The cut pieces are filled into a cylindrically shaped metal basket with perforations through which the impregnating liquid can freely pass, the basket being the inner part of a heated centrifuge. The basket is closed at the bottom and top and immersed into the impregnating liquid which may be a molten wax or wax solution or any other material usable within the spirit and scope of the invention. After the basket has been immersed sufficiently long for the liquid to penetrate all foam pieces the basket is withdrawn and put in place in the centrifuge. The centrifuge is then allowed to spin for a short time to throw off all undesirable excess of liquid. The centrifuged material is then dumped onto a wire-mesh which may be a conveyor where any further excess impregnant might be removed by hot draining and/or drying, whatever the case might be, followed by subsequent cooling. There is a possibility that the finished piece might slightly stick to the wire-mesh from which they can be easily shaken-off or stripped-off. No damage is done to the material by the removal action, as any piece has uniform properties throughout its mass and not only on its surface.

As mentioned before, other materials than microcrystalline waxes might lead to similar results. Other waxes, even hard waxes, can be plasticized with oils or plasticizers, such as tricresyl phosphate etc. to form plastic masses. Waxes compounded with polyethylene, polyisobutylenes, polyisobutane, resins, etc. also form plastic masses which will provide the properties looked for in filled foams which are non-resilient, pliable, ductive and preferably self-adamant. A plasticized low-molecular polystyrene resin with a melting point of approximately 100° C. can form a suitable impregnant. For instance, a compound comprising 60% by weight of such polystyrene resin and approximately 40% by weight dicyclohexyl phthalate can be applied as a hot melt or a hot melt diluted with a volative solvent to yield a filled foam with all described properties and with strong adhesive tack.

It should be understood, however, that the description and examples herein given, while indicating preferred embodiments of the invention, are given by way of illustration only, since numerous changes and modifications within the spirit and scope of the invention are possible and will become apparent from this description to those skilled in the art.

I claim:
1. A non-resilient, pliable, ductile, filled-foam product comprising an originally flexible and resilient open-cell polymeric foam, the cells of which are filled with a solid material which is firmly anchored inside said foam cells and which has physical properties such as to render said filled-foam non-resilient, pliable and ductile, said solid material being selected from the group consisting of a microcrystalline wax; a microcrystalline wax compounded with at least one of polyethylene, polyisobutylene, and a plasticizer compatible with said microcrystalline wax; and a plasticized, low molecular weight polystyrene resin composition consisting essentially of about 60% by weight of a polystyrene resin having a melting point of about 100° C. and about 40% by weight of dicyclohexyl phthalate; the amount of said solid filling material in said filled-foam being from about four times to about twenty-five times by weight of said polymeric foam.

2. The filled-foam product of claim 1 wherein said polymeric foam is a polyurethane foam of the polyester or polyether type, a vinyl polymer foam or a rubber foam.

3. The filled-foam product of claim 1 which is capable of adhering to itself.

4. A process for manufacturing a non-resilient, pliable, ductile filled-foam product which comprises impregnating a flexible, elastic, resilient, open-cell polymeric foam with substantially from four times to twenty-five times the weight of said foam of a heated liquid comprising a material which is capable of solidifying within the cells of said open cell foam, said solidified filling material having properties such as to render the pore-filled foam non-resilient, pliable and ductile, said filling material being selected from the group consisting of a microcrystalline wax; a microcrystalline wax compounded with at least one of polyethylene, polyisobutylene and a plasticizer compatible with said microcrystalline wax; and a plasticized, low molecular weight polystyrene resin composition consisting essentially of about 60% by weight of a polystyrene resin having a melting point of about 100° C. and about 40% by weight of dicyclohexyl phthalate; and subsequently solidifying said filling material within said cells.

5. The process of claim 4 wherein said liquid comprises a normally solid material in the molten state and said material is solidified within said cells by cooling.

6. The process of claim 4 wherein said liquid comprises a solution of said solidifiable material and said material is solidified within said cells by evaporating the solvent.

7. The process of claim 4 wherein said polymeric foam is a polyurethane foam of the polyester or polyether type, a vinyl polymer foam or a rubber foam.

References Cited

UNITED STATES PATENTS

| 2,744,075 | 5/1956 | Roberts | 260—2.5 |
| 2,964,424 | 12/1960 | Mast. | |
| 3,193,438 | 7/1965 | Schafer | 161—89 |
| 3,193,440 | 7/1965 | Schafer | 161—159 |
| 3,193,441 | 7/1965 | Schafer | 264—257 |

FOREIGN PATENTS

| 1,291,190 | 3/1962 | France. |
| 1,297,892 | 5/1961 | France. |
| 1,065,962 | 9/1959 | Germany. |

MURRAY TILLMAN, Primary Examiner

W. J. BRIGGS, Sr., Assistant Examiner

U.S. Cl. X.R.

117—98; 260—28, 28.5, 37, 41, 41.5